(12) United States Patent
Hu

(10) Patent No.: US 11,787,492 B1
(45) Date of Patent: Oct. 17, 2023

(54) BICYCLE LIGHT ASSEMBLY AND MANUFACTURING METHOD THEREOF

(71) Applicant: Cheng Uei Precision Industry Co., Ltd., New Taipei (TW)

(72) Inventor: Ching Lin Hu, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 18/121,260

(22) Filed: Mar. 14, 2023

Related U.S. Application Data

(60) Provisional application No. 63/399,766, filed on Aug. 22, 2022.

(51) Int. Cl.
*B62J 6/029* (2020.01)
*B62J 6/03* (2020.01)

(52) U.S. Cl.
CPC ....... *B62J 6/029* (2020.02); *B62J 6/03* (2020.02)

(58) Field of Classification Search
CPC .................................................. B62J 6/026–03
See application file for complete search history.

(56) References Cited

U.S. PATENT DOCUMENTS

2012/0096978 A1 * 4/2012 Voshell ................. B62K 21/12
74/551.8

FOREIGN PATENT DOCUMENTS

| CN | 215851613 U | * | 2/2022 | |
|----|---|---|---|---|
| DE | 4410232 A1 | * | 9/1995 | ............... B62J 6/02 |
| EP | 1394028 A1 | * | 3/2004 | ............... B62J 6/00 |
| EP | 1564122 A2 | * | 8/2005 | ............... B62J 11/00 |
| WO | WO-2010128761 A2 | * | 11/2010 | ............... B62J 6/02 |

* cited by examiner

*Primary Examiner* — Mariceli Santiago
(74) *Attorney, Agent, or Firm* — LIN & ASSOCIATES INTELLECTUAL PROPERTY, INC.

(57) ABSTRACT

A bicycle light assembly includes a light shell, a light holder, a light device and a positioning element. The light shell surrounds tubes of a bicycle frame. The light shell has a locating space penetrating through the light shell in a front-to-rear direction, and an opening communicated with the locating space. The light holder is covered to a front of the opening. The light device is connected to the light holder. The light device is positioned in the locating space. The positioning element is positioned in the locating space. The positioning element has a main body. The main body is sleeved on an outer surface of the light device. The main body has a first positioning piece and a second positioning piece. The first positioning piece abuts against an inner surface of the light shell. The second positioning piece abuts against a rear surface of the light holder.

20 Claims, 5 Drawing Sheets

BICYCLE LIGHT ASSEMBLY AND MANUFACTURING METHOD THEREOF

CROSS-REFERENCE TO RELATED APPLICATION

The present application is based on, and claims priority from, U.S. Provisional Patent Application No. 63/399,766, filed Aug. 22, 2022, the disclosure of which is hereby incorporated by reference herein in its entirety.

BACKGROUND OF THE INVENTION

1. Field of the Invention

The present invention generally relates to a bicycle light assembly, and more particularly to a bicycle light assembly for an electric bicycle, and a manufacturing method of the bicycle light assembly.

2. The Related Art

With the rise of exercise concepts and environmental protection awarenesses, more and more people use bicycles as commute vehicles or entertainment vehicles. In the production of a conventional bicycle, a basic structure of the conventional bicycle mainly uses a frame as a mainstay, tubes of the conventional bicycle are combined by a soldered way or a glued way, etc. The frame of the conventional bicycle is manufactured by virtue of combining the tubes.

However, after the frame of the conventional bicycle is soldered, an overall structure of the frame of the conventional bicycle causes a rigidity heterogeneity due to a manual soldering defect or an uneven soldering path condition, so a usage life and quality of the frame of the conventional bicycle is affected. Furthermore, scratch problems, abrasion problems or other problems of the frame of the conventional bicycle are easily caused on account of touching the frame of the conventional bicycle.

In addition, an accessory of the conventional bicycle, such as a bicycle light is usually bundled to the frame of the conventional bicycle by an outside hanging way, when the outside hanging bicycle light is in use, scratch problems, abrasion problems or other problems of the bicycle light of the conventional bicycle are easily caused on account of touching the bicycle light of the conventional bicycle.

SUMMARY OF THE INVENTION

An object of the present invention is to provide a bicycle light assembly adapted for being fixed to a bicycle frame. The bicycle light assembly includes a light shell, a light holder, a light device and a positioning element. The light shell surrounds tubes of the bicycle frame. The light shell has a locating space penetrating through the light shell in a front-to-rear direction, and an opening penetrating through a front surface of the light shell. The opening is communicated with the locating space. The light holder is covered to a front of the opening. The light device is connected to the light holder. The light device is positioned in the locating space. The positioning element is positioned in the locating space. The positioning element has a main body. The main body is sleeved on an outer surface of the light device. The main body has a first positioning piece and a second positioning piece. The first positioning piece and the second positioning piece are disposed opposite to each other. The first positioning piece abuts against an inner surface of the light shell. The second positioning piece abuts against a rear surface of the light holder.

Another object of the present invention is to provide a bicycle light assembly adapted for being fixed to a bicycle frame. The bicycle light assembly includes a light shell and a bicycle light. The light shell surrounds tubes of the bicycle frame. The light shell has a locating space penetrating through the light shell in a front-to-rear direction, and an opening penetrating through a front surface of the light shell. The opening is communicated with the locating space. The bicycle light is mounted in the locating space. The bicycle light includes a light holder covered to a front of the opening, a light device connected to the light holder, and a positioning element. The light device is positioned in the locating space. The positioning element is positioned in the locating space. The positioning element has a main body. The main body is sleeved on an outer surface of the light device. The main body has a first positioning piece and a second positioning piece. The first positioning piece and the second positioning piece are disposed opposite to each other. The first positioning piece and the second positioning piece are arranged along an up-down direction. The first positioning piece abuts against an inner surface of the light shell. The second positioning piece abuts against a rear surface of the light holder.

Another object of the present invention is to provide a manufacturing method of a bicycle light assembly. Specific steps of the manufacturing method of the bicycle light assembly are described hereinafter. Assemble a light shell to a connecting area where a head tube, an upper tube and a lower tube of a bicycle frame are soldered. The light shell has a locating space penetrating through the light shell in a front-to-rear direction, and an opening penetrating through a front surface of the light shell. The opening is communicated with the locating space. Assemble a light device behind a light holder, and assemble a positioning element between the light device and the light holder, at the moment, a bicycle light which includes the light holder, the light device and the positioning element is completed being assembled. Locate the bicycle light in the locating space through the opening. Insert a locking element in the locating space through a fastening hole of the light shell.

As described above, the light shell of the bicycle light assembly is assembled to the connecting area where the head tube, the upper tube and the lower tube are fixed, a structure of the bicycle light assembly is simplified, so a structure stability of the bicycle frame and a structure stability of the bicycle light assembly are improved. As a result, a usage life of the bicycle light is enhanced.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
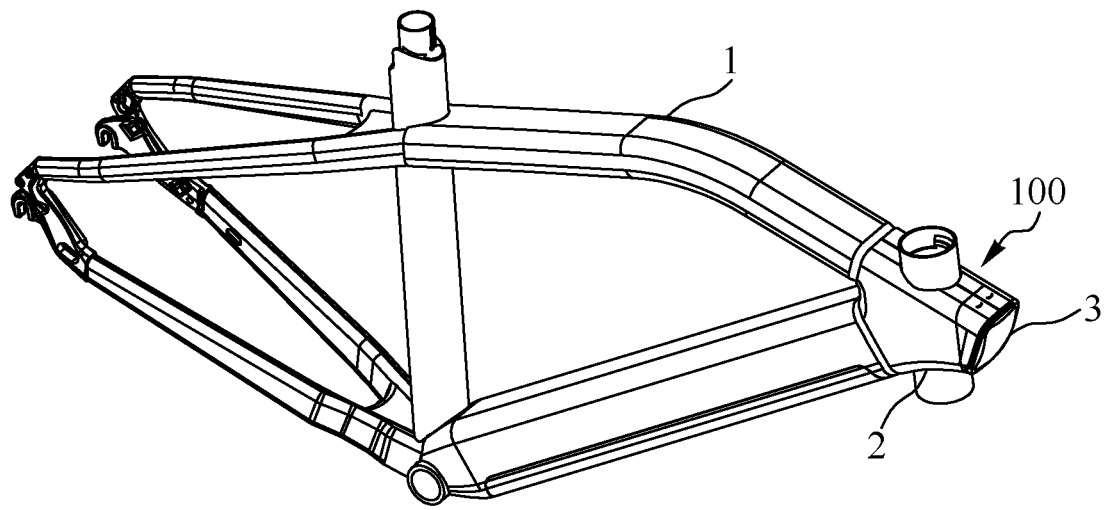
FIG. 1 is a perspective view of a bicycle light assembly in accordance with a preferred embodiment of the present invention.
Figure 2:
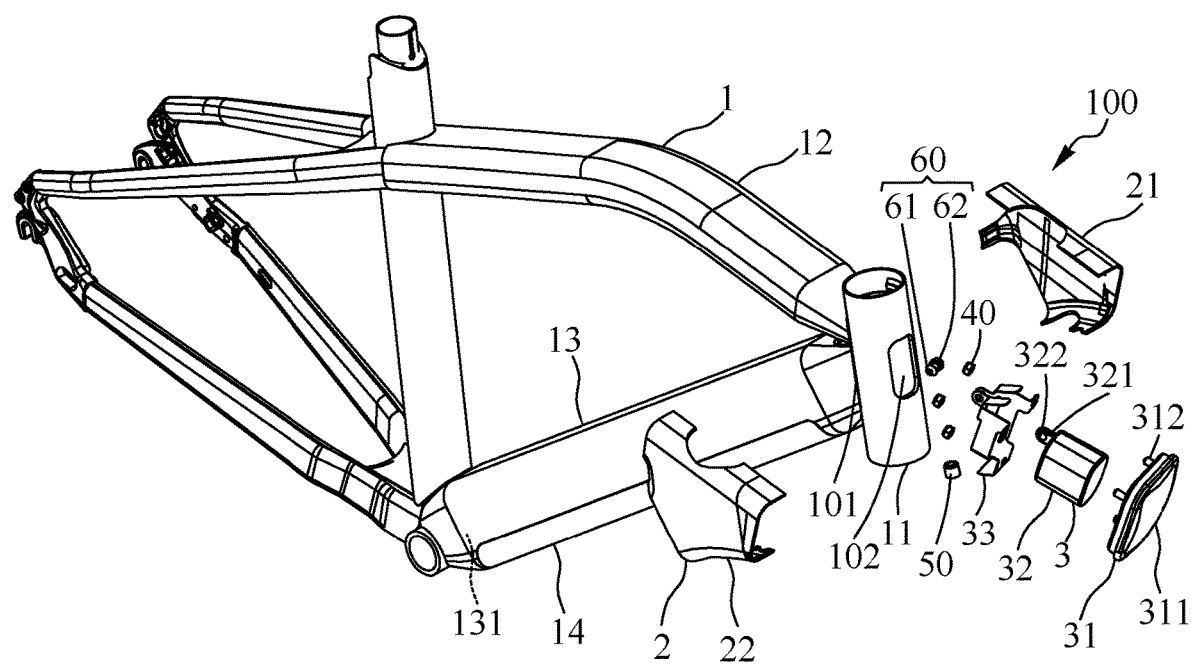
FIG. 2 is an exploded view of the bicycle light assembly of FIG. 1.

With reference to FIG. 1 and FIG. 2, a bicycle light assembly 100 and a manufacturing method of the bicycle light assembly 100 in accordance with a preferred embodiment of the present invention are shown. In the preferred embodiment, the bicycle light assembly 100 is adapted for being fixed to a bicycle frame 1. The bicycle light assembly 100 is fixed to connecting areas among tubes of the bicycle frame 1, so that a structure stability of the bicycle light assembly 100 is improved. The bicycle light assembly 100 includes a light shell 2 and a bicycle light 3.

Referring to FIG. 1 and FIG. 2, the bicycle frame 1 includes a head tube 11, an upper tube 12 and a lower tube 13. The head tube 11 is disposed along an up-down direction. A top and a bottom of the head tube 11 are opened freely. A front end of the upper tube 12 is fastened to a middle of the head tube 11. The front end of the upper tube 12 is soldered to the middle of the head tube 11. A front end of the lower tube 13 is fastened to the middle of the head tube 11. The front end of the lower tube 13 is soldered to the middle of the head tube 11. The lower tube 13 is located under the upper tube 12. The middle of the head tube 11 defines a through-hole 102 longitudinally penetrating through the head tube 11. The front end of the upper tube 12 and the front end of the lower tube 13 are corresponding to the through-hole 102. The front end of the upper tube 12 and the front end of the lower tube 13 are inserted to the through-hole 102. In the preferred embodiment, the head tube 11, the upper tube 12 and the lower tube 13 are made of an aluminium alloy, an titanium alloy, an iron or a carbon fiber, etc. The lower tube 13 is hollow, and an inside of the lower tube 13 has an accommodating space 131 for accommodating a battery module (not shown). A lower portion of the lower tube 13 is equipped with a sealing cover 14. The sealing cover 14 covers the accommodating space 131. The battery module is used as a motor. The battery module provides electric power for an electric bicycle.

Referring to FIG. 1 to FIG. 4, the light shell 2 is assembled to a connecting area 101 among the head tube 11, the upper tube 12 and the lower tube 13. The light shell 2 surrounds tubes of the bicycle frame 1. The tubes of the bicycle frame 1 include the head tube 11, the upper tube 12 and the lower tube 13. The light shell 2 is made into a specific shape, and the light shell 2 is cooperated with each of the head tube 11, the upper tube 12 and the lower tube 13. The light shell 2 fully encloses an outer surface of the connecting area 101 where the head tube 11, the upper tube 12 and the lower tube 13 are fastened. In the preferred embodiment, the light shell 2 is made of the aluminium alloy, the titanium alloy, the iron or the carbon fiber, etc. In the preferred embodiment, the light shell 2 has a first shell 21, and a second shell 22 connected to the first shell 21. The first shell 21 and the second shell 22 are assembled to two sides of the head tube 11. The first shell 21 and the second shell 22 are symmetrical with respect to the head tube 11. The first shell 21 and the second shell 22 are assembled together. The first shell 21 and the second shell 22 form a mirrored structure.

Figure 3:
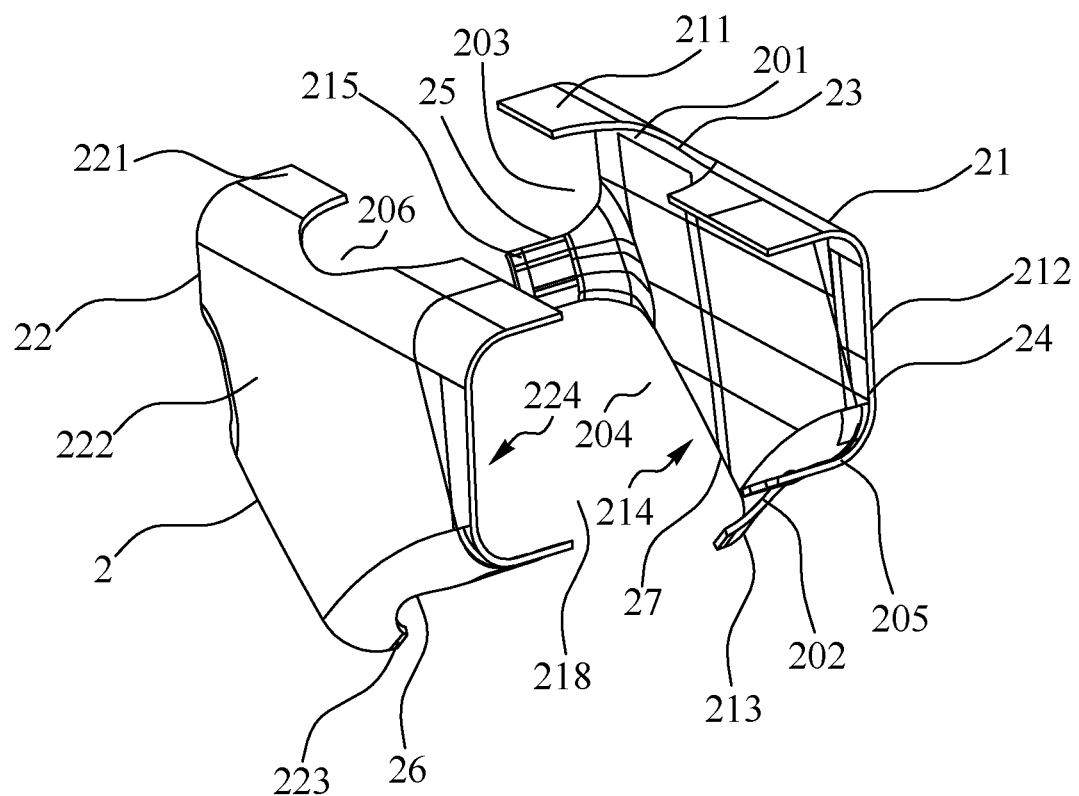
FIG. 3 is a perspective view of a light shell of the bicycle light assembly in accordance with the preferred embodiment of the present invention.
Figure 4:
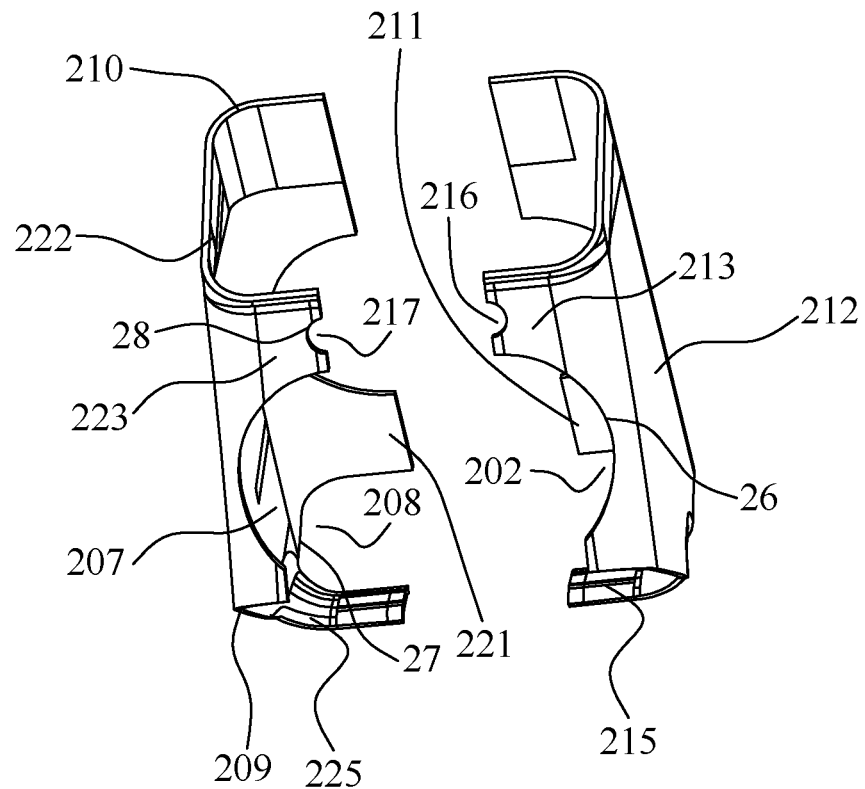
FIG. 4 is another perspective view of the light shell of the bicycle light assembly in accordance with the preferred embodiment of the present invention.

Referring to FIG. 2 to FIG. 4, the first shell 21 has a first top plate 211, a first side plate 212, a first bottom plate 213 and a first rear plate 215. The first top plate 211 extends along a front-to-rear direction. The first side plate 212 is extended downward from an outer edge of the first top plate 211. The first top plate 211 is substantially vertical to the first side plate 212. A middle of the first top plate 211 defines a first top recess 201 penetrating through a middle of an inner edge of the first top plate 211. The first bottom plate 213 is slantwise extended downward and inward from a bottom edge of the first side plate 212. The first bottom plate 213 defines a first bottom recess 202 penetrating through a middle of an inner edge of the first bottom plate 213. The first rear plate 215 is extended inward from a middle of a rear edge of the first side plate 212. An upper edge of the first rear plate 215, the rear edge of the first side plate 212 and a rear edge of the first top plate 211 surround a first rear recess 203. A bottom edge of the first rear plate 215, the rear edge of the first side plate 212 and a rear edge of the first bottom plate 213 surround a second rear recess 204. The first top plate 211, the first side plate 212 and the first bottom plate 213 surround a first receiving space 214. A front edge of the first top plate 211, a front edge of the first side plate 212 and a front edge of the first bottom plate 213 surround a first front recess 205.

Referring to FIG. 2 to FIG. 4, the second shell 22 has a second top plate 221, a second side plate 222, a second bottom plate 223 and a second rear plate 225. The second side plate 222 is extended downward from an outer edge of the second top plate 221. The second top plate 221 is substantially vertical to the second side plate 222. A middle of the second top plate 221 defines a second top recess 206 penetrating through a middle of an inner edge of the second top plate 221. The second bottom plate 223 is slantwise extended downward and inward from a bottom edge of the second side plate 222. The second bottom plate 223 defines a second bottom recess 207 penetrating through a middle of an inner edge of the second bottom plate 223. The second rear plate 225 is extended inward from a middle of a rear edge of the second side plate 222. An upper edge of the second rear plate 225, the rear edge of the second side plate 222 and a rear edge of the second top plate 221 surround a third rear recess 208. A bottom edge of the second rear plate 225, the rear edge of the second side plate 222 and a rear edge of the second bottom plate 223 surround a fourth rear recess 209. The second top plate 221, the second side plate 222 and the second bottom plate 223 surround a second receiving space 224. A front edge of the second top plate 221, a front edge of the second side plate 222 and a front edge of the second bottom plate 223 surround a second front recess 210.

Referring to FIG. 2 to FIG. 4, the first top recess 201 of the first top plate 211 of the first shell 21 and the second top recess 206 of the second top plate 221 of the second shell 22 are assembled to form a first connecting groove 23. The first front recess 205 of the first shell 21 and the second front recess 210 of the second shell 22 are assembled to form an opening 24. The first rear recess 203 and the third rear recess 208 are assembled to form a second connecting groove 25. The first bottom recess 202 of the first bottom plate 213 of the first shell 21 and the second bottom recess 207 of the second bottom plate 223 of the second shell 22 are assembled to form a third connecting groove 26. The second rear recess 204 and the fourth rear recess 209 are assembled to form a fourth connecting groove 27. In the preferred embodiment, the first bottom plate 213 of the first shell 21 defines a first perforation 216 located in front of the first bottom recess 202. The second bottom plate 223 of the second shell 22 defines a second perforation 217 located in front of the second bottom recess 207. The first perforation 216 and the second perforation 217 are assembled to form a fastening hole 28.

Referring to FIG. 1 to FIG. 3, the head tube 11 passes through the first connecting groove 23 and the third connecting groove 26. The front end of the upper tube 12 passes through the second connecting groove 25. The front end of the lower tube 13 passes through the fourth connecting groove 27. Therefore, the first shell 21 and the second shell 22 fully enclose the connecting area 101 where the head tube 11, the upper tube 12 and the lower tube 13 are soldered. The first shell 21 and the second shell 22 cover soldering paths of the head tube 11 to which the upper tube 12 and the lower tube 13 are soldered, so that a structure stability of the connecting area 101 where the head tube 11, the upper tube 12 and the lower tube 13 of the bicycle frame 1 are soldered.

Referring to FIG. 2 to FIG. 4, the light shell 2 encloses the head tube 11, the upper tube 12 and the lower tube 13 of the bicycle frame 1. The light shell 2 has a locating space 218 penetrating through the light shell 2 in a front-to-rear direction, and the opening 24 penetrating through a front surface of the light shell 2. The opening 24 is communicated with the locating space 218. The first receiving space 214 of the first shell 21 and the second receiving space 224 of the second shell 22 are combined to form the locating space 218. The head tube 11, the upper tube 12, the lower tube 13 and the bicycle light 3 are received in the locating space 218.

Referring to FIG. 2 to FIG. 5, in the preferred embodiment, the bicycle light 3 is mounted in the locating space 218. The locating space 218 loads the bicycle light 3. The bicycle light 3 includes a light holder 31, a light device 32 and a positioning element 33. The light holder 31 is located to a front end of the light device 32. The light holder 31 is covered to a front of the opening 24. The light device 32 is connected to the light holder 31. The light device 32 and the positioning element 33 are positioned in the locating space 218. The positioning element 33 sleeves on an outer surface of the light device 32. A front surface of the light holder 31 is defined as a light output surface 311. A rear surface of the light holder 31 protrudes rearward to form a protruding pillar 312. Several portions of the rear surface of the light holder 31 protrude rearward to form a plurality of the protruding pillars 312. The light output surface 311 is exposed outside of the opening 24. When the electric bicycle is ridden, the light output surface 311 is provided for an illumination. The light device 32 is fastened between the light holder 31 and the positioning element 33. The light device 32 is fastened to the light holder 31 through the positioning element 33, so that the light device 32 is stably assembled to the light holder 31, and a structure of the bicycle light 3 is improved. Light rays emitted by the light device 32 are ejected from the light output surface 311 of the light holder 31. An upper portion of a rear surface of the light device 32 protrudes rearward to form a fixing portion 321. The fixing portion 321 has a screw hole 322 transversely penetrating through the fixing portion 321.

Referring to FIG. 2 to FIG. 5, the positioning element 33 has a main body 330. The main body 330 has a first positioning piece 39, a second positioning piece 333, a third positioning piece 37 and a fourth positioning piece 38. The first positioning piece 39 and the second positioning piece 333 are disposed opposite to each other. The first positioning piece 39 and the second positioning piece 333 are arranged along the up-down direction. In the preferred embodiment, a front end of the main body 330 has the third positioning piece 37. A rear end of the main body 330 has the fourth positioning piece 38. A top end of the main body 330 has the first positioning piece 39. The main body 330 is sleeved on the outer surface of the light device 32. The third positioning piece 37 is fastened to the protruding pillar 312 of the light holder 31, and the third positioning piece 37 is connected to the protruding pillar 312 of the light holder 31. The second positioning piece 333 and the third positioning piece 37 are fastened to the plurality of the protruding pillars 312 of the light holder 31. The fourth positioning piece 38 is fastened to the fixing portion 321 of the light device 32, and the fourth positioning piece 38 is connected to the fixing portion 321 of the light device 32. The first positioning piece 39 abuts against an inner surface of the light shell 2. The first positioning piece 39 abuts against an inner surface of the first top plate 211 and an inner surface of the second top plate 221.

Figure 5:
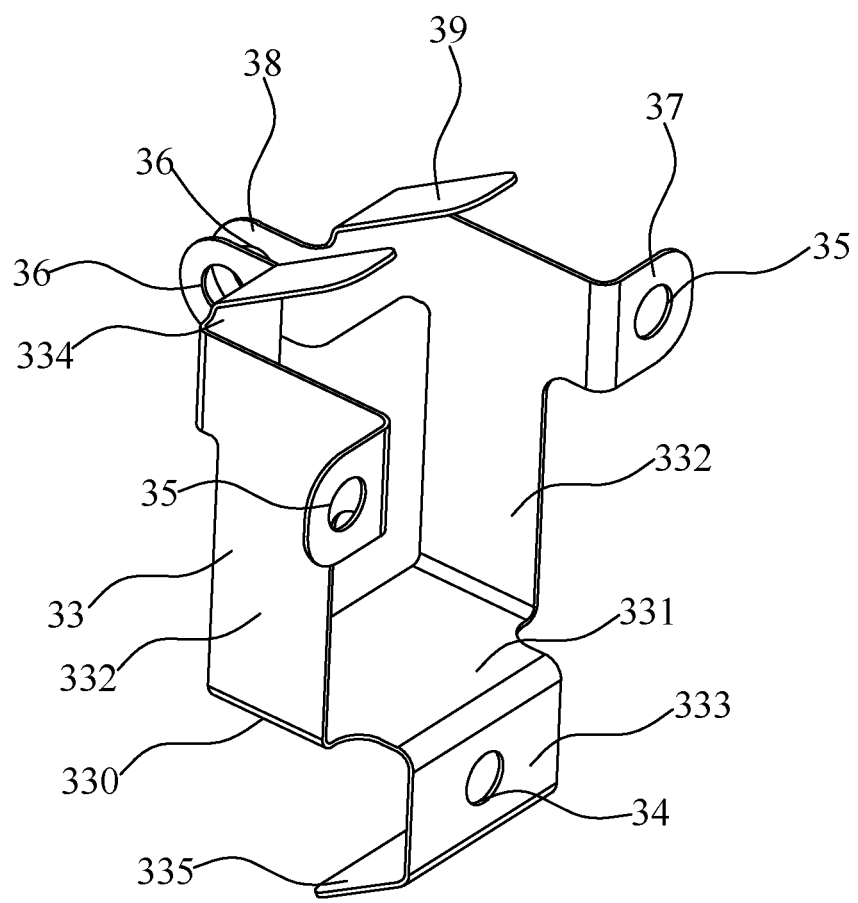
FIG. 5 is a perspective view of a positioning element of the bicycle light assembly in accordance with the preferred embodiment of the present invention.

Referring to FIG. 2 and FIG. 5, the main body 330 has a base piece 331. Two opposite sides of the base piece 331 extend upward to form two side pieces 332. A front edge of the base piece 331 extends downward to form the second positioning piece 333. A middle of the second positioning piece 333 defines a first fixing hole 34. Two upper portions of two front edges of the two side pieces 332 are bent outward to form two opposite third positioning pieces 37. Each third positioning piece 37 defines a second fixing hole 35. A bottom edge of the second positioning piece 333 slantwise extends downward and rearward to form an extension piece 335. Two upper portions of two rear edges of the two side pieces 332 are bent towards each other to form two connecting pieces 334. Two free ends of the two connecting pieces 334 extend rearward to form two fourth positioning pieces 38. Each fourth positioning piece 38 defines a third fixing hole 36. Two top edges of the two connecting pieces 334 slantwise extend upward and frontward to form two first positioning pieces 39.

Referring to FIG. 2 to FIG. 5, the light device 32 is assembled among the base piece 331, the two side pieces 332 and the two connecting pieces 334. The second positioning piece 333 abuts against the rear surface of the light holder 31. The two third positioning pieces 37 abut against the rear surface of the light holder 31. The plurality of the protruding pillars 312 of the light holder 31 pass through the first fixing hole 34 of the second positioning piece 333 and the two second fixing holes 35 of the two third positioning pieces 37, and then a plurality of fastening elements 40 are sleeved around the plurality of the protruding pillars 312, so the light holder 31 and the second positioning piece 333 are fixed with each other, and the two third positioning pieces 37 are fixed with the light holder 31. The extension piece 335 is parallel to the first bottom plate 213 of the first shell 21 and the second bottom plate 223 of the second shell 22.

In the preferred embodiment, the fastening hole 28 of the light shell 2 is equipped with a locking element 50. The locking element 50 is inserted into the light shell 2, and the locking element 50 abuts against the extension piece 335. The base piece 331 and the two side pieces 332 abut against a bottom surface and two side surfaces of the light device 32. The two connecting pieces 334 abut against the rear surface of the light device 32. When the two connecting pieces 334 abut against the rear surface of the light device 32, the light device 32 is located inside the main body 330. The fixing portion 321 of the light device 32 is clamped between the two fourth positioning pieces 38, and then the fixing portion 321 of the light device 32 and the two fourth positioning pieces 38 are equipped with a tightening element 60. Specifically, the tightening element 60 includes a screw 61 and a nut 62. The screw 61 passes through the screw hole 322 of the fixing portion 321 and the two third fixing holes 36 of the two fourth positioning pieces 38, and then the nut 62 is engaged with the screw 61, so the nut 62 is locked with the screw 61 tightly, and the positioning element 33 and the light device 32 are fixed with each other.

Therefore, the bicycle light assembly 100 is able to be integrated with the bicycle frame 1, so a structure of the electric bicycle is simplified, the bicycle light 3 is prevented from being scratched or damaged on account of touching the bicycle light 3, and a usage life of the bicycle light 3 is enhanced.

Referring to FIG. 1 to FIG. 5, when the bicycle light assembly 100 is assembled, specific steps of the manufacturing method of the bicycle light assembly 100 are described as follows.

At first, assemble the light shell 2 to the connecting area 101 where the head tube 11, the upper tube 12 and the lower tube 13 of the bicycle frame 1 are soldered.

Then, assemble the light device 32 behind the light holder 31, and assemble the positioning element 33 between the light device 32 and the light holder 31, at the moment, the bicycle light 3 which includes the light holder 31, the light device 32 and the positioning element 33 is completed being assembled.

Later, locate the bicycle light 3 in the locating space 218 through the opening 24 of the light shell 2.

At last, insert the locking element 50 in the locating space 218 through the fastening hole 28 of the light shell 2, a top of the locking element 50 abuts against the extension piece 335, and the two first positioning pieces 39 abut against an inner surface of the light shell 2, so the bicycle light 3 is assembled to the light shell 2, and the bicycle light 3 is fastened to the light shell 2.

As described above, the light shell 2 of the bicycle light assembly 100 is assembled to the connecting area 101 where the head tube 11, the upper tube 12 and the lower tube 13 are fixed, a structure of the bicycle light assembly 100 is simplified, so a structure stability of the bicycle frame 1 and the structure stability of the bicycle light assembly 100 are improved. As a result, the usage life of the bicycle light 3 is enhanced.

What is claimed is:

1. A bicycle light assembly adapted for being fixed to a bicycle frame, comprising:
    a light shell surrounding tubes of the bicycle frame, the light shell having a locating space penetrating through the light shell in a front-to-rear direction, and an opening penetrating through a front surface of the light shell, the opening being communicated with the locating space;
    a light holder covered to a front of the opening;
    a light device connected to the light holder, the light device being positioned in the locating space; and
    a positioning element positioned in the locating space, the positioning element having a main body, the main body sleeved on an outer surface of the light device, the main body having a first positioning piece and a second positioning piece, the first positioning piece and the second positioning piece being disposed opposite to each other, the first positioning piece abutting against an inner surface of the light shell, the second positioning piece abutting against a rear surface of the light holder.

2. The bicycle light assembly as claimed in claim 1, wherein the main body has a third positioning piece and a fourth positioning piece, a rear surface of the light holder protrudes rearward to form a protruding pillar, the third positioning piece is fastened to the protruding pillar of the light holder and the third positioning piece is connected to the protruding pillar of the light holder, an upper portion of a rear surface of the light device protrudes rearward to form a fixing portion, the fourth positioning piece is fastened to the fixing portion, and the fourth positioning piece is connected to the fixing portion.

3. The bicycle light assembly as claimed in claim 2, wherein the main body has a base piece, two opposite sides of the base piece extend upward to form two side pieces, two upper portions of two rear edges of the two side pieces are bent towards each other to form two connecting pieces, two free ends of the two connecting pieces extend rearward to form two fourth positioning pieces, the fixing portion is clamped between the two fourth positioning pieces.

4. The bicycle light assembly as claimed in claim 3, wherein two upper portions of two front edges of the two side pieces are bent outward to form two opposite third positioning pieces, the two third positioning pieces abut against the rear surface of the light holder, a front edge of the base piece extends downward to form the second positioning piece, a bottom edge of the second positioning piece slantwise extends downward and rearward to form an extension piece, two top edges of the two connecting pieces slantwise extend upward and frontward to form two first positioning pieces.

5. The bicycle light assembly as claimed in claim 4, wherein a middle of the second positioning piece defines a first fixing hole, each third positioning piece defines a second fixing hole, several portions of the rear surface of the light holder protrude rearward to form a plurality of the protruding pillars, the plurality of the protruding pillars pass through the first fixing hole of the second positioning piece and the two second fixing holes of the two third positioning pieces, and then a plurality of fastening elements are sleeved around the plurality of the protruding pillars.

6. The bicycle light assembly as claimed in claim 5, wherein each fourth positioning piece defines a third fixing hole, the fixing portion has a screw hole transversely penetrating through the fixing portion, the fixing portion of the light device and the two fourth positioning pieces are equipped with a tightening element, the tightening element includes a screw and a nut, the screw passes through the screw hole of the fixing portion and the two third fixing holes of the two fourth positioning pieces, and then the nut is engaged with the screw.

7. The bicycle light assembly as claimed in claim 4, wherein the light device is assembled among the base piece, the two side pieces and the two connecting pieces, the base piece and the two side pieces abut against a bottom surface and two side surfaces of the light device, the two connecting pieces abut against the rear surface of the light device.

8. The bicycle light assembly as claimed in claim 4, wherein the light shell has a first shell, and a second shell connected to the first shell, the extension piece is parallel to a first bottom plate of the first shell and a second bottom plate of the second shell.

9. The bicycle light assembly as claimed in claim 1, wherein the bicycle frame includes a head tube, an upper tube and a lower tube, the tubes of the bicycle frame include the head tube, the upper tube and the lower tube, a middle of the head tube defines a through-hole longitudinally penetrating through the head tube, a front end of the upper tube and a front end of the lower tube are inserted to the through-hole, the front end of the upper tube is soldered to the middle of the head tube, the front end of the lower tube is soldered to the middle of the head tube, the light shell fully encloses an outer surface of a connecting area where the head tube, the upper tube and the lower tube are fastened.

10. The bicycle light assembly as claimed in claim 9, wherein the light shell has a first shell and a second shell, the first shell and the second shell are assembled to two sides of the head tube, the first shell and the second shell are symmetrical with respect to the head tube, the first shell and the second shell cover soldering paths of the head tube to which the upper tube and the lower tube are soldered.

11. A bicycle light assembly adapted for being fixed to a bicycle frame, comprising:
a light shell surrounding tubes of the bicycle frame, the light shell having a locating space penetrating through the light shell in a front-to-rear direction, and an opening penetrating through a front surface of the light shell, the opening being communicated with the locating space; and
a bicycle light mounted in the locating space, the bicycle light including
a light holder covered to a front of the opening,
a light device connected to the light holder, the light device being positioned in the locating space, and
a positioning element positioned in the locating space, the positioning element having a main body, the main body sleeved on an outer surface of the light device, the main body having a first positioning piece and a second positioning piece, the first positioning piece and the second positioning piece being disposed opposite to each other, the first positioning piece and the second positioning piece being arranged along an up-down direction, the first positioning piece abutting against an inner surface of the light shell, the second positioning piece abutting against a rear surface of the light holder.

12. A manufacturing method of a bicycle light assembly, comprising steps of:
assembling a light shell to a connecting area where a head tube, an upper tube and a lower tube of a bicycle frame are soldered, the light shell having a locating space penetrating through the light shell in a front-to-rear direction, and an opening penetrating through a front surface of the light shell, the opening being communicated with the locating space;
assembling a light device behind a light holder, and assembling a positioning element between the light device and the light holder, at the moment, a bicycle light which includes the light holder, the light device and the positioning element being completed being assembled;
locating the bicycle light in the locating space through the opening; and
inserting a locking element in the locating space through a fastening hole of the light shell.

13. The manufacturing method of the bicycle light assembly as claimed in claim 12, wherein the positioning element has a main body sleeved on an outer surface of the light device, the main body has a first positioning piece and a second positioning piece, the first positioning piece abuts against an inner surface of the light shell, the second positioning piece abuts against a rear surface of the light holder.

14. The manufacturing method of the bicycle light assembly as claimed in claim 13, wherein the main body has a base piece, two opposite sides of the base piece extend upward to form two side pieces, two upper portions of two front edges of the two side pieces are bent outward to form two opposite third positioning pieces, the two third positioning pieces abut against the rear surface of the light holder, a front edge of the base piece extends downward to form the second positioning piece, a bottom edge of the second positioning piece slantwise extends downward and rearward to form an extension piece, a top of the locking element abuts against the extension piece, two top edges of the two connecting pieces slantwise extend upward and frontward to form two first positioning pieces, the two first positioning pieces abut against the inner surface of the light shell.

15. The manufacturing method of the bicycle light assembly as claimed in claim 14, wherein two upper portions of two rear edges of the two side pieces are bent towards each other to form two connecting pieces, two free ends of the two connecting pieces extend rearward to form two fourth positioning pieces, an upper portion of a rear surface of the light device protrudes rearward to form a fixing portion, the fixing portion is clamped between the two fourth positioning pieces.

16. The manufacturing method of the bicycle light assembly as claimed in claim 15, wherein a middle of the second positioning piece defines a first fixing hole, each third positioning piece defines a second fixing hole, several portions of the rear surface of the light holder protrude rearward to form a plurality of the protruding pillars, the plurality of the protruding pillars pass through the first fixing hole of the second positioning piece and the two second fixing holes of the two third positioning pieces, and then a plurality of fastening elements are sleeved around the plurality of the protruding pillars.

17. The manufacturing method of the bicycle light assembly as claimed in claim 16, wherein each fourth positioning piece defines a third fixing hole, the fixing portion has a screw hole transversely penetrating through the fixing portion, the fixing portion of the light device and the two fourth positioning pieces are equipped with a tightening element, the tightening element includes a screw and a nut, the screw passes through the screw hole of the fixing portion and the two third fixing holes of the two fourth positioning pieces, and then the nut is engaged with the screw.

18. The manufacturing method of the bicycle light assembly as claimed in claim 15, wherein the light device is assembled among the base piece, the two side pieces and the two connecting pieces, the base piece and the two side pieces abut against a bottom surface and two side surfaces of the light device, the two connecting pieces abut against the rear surface of the light device.

19. The manufacturing method of the bicycle light assembly as claimed in claim 12, wherein a middle of the head tube defines a through-hole longitudinally penetrating through the head tube, a front end of the upper tube and a front end of the lower tube are inserted to the through-hole, the front end of the upper tube is soldered to the middle of the head tube, the front end of the lower tube is soldered to the middle of the head tube, the light shell fully encloses an outer surface of a connecting area where the head tube, the upper tube and the lower tube are fastened.

20. The manufacturing method of the bicycle light assembly as claimed in claim 19, wherein the light shell has a first shell and a second shell, the first shell and the second shell are assembled to two sides of the head tube, the first shell and the second shell are symmetrical with respect to the head tube, the first shell and the second shell cover soldering paths of the head tube to which the upper tube and the lower tube are soldered.

* * * * *